United States Patent
Yeum

(10) Patent No.: US 9,862,550 B2
(45) Date of Patent: Jan. 9, 2018

(54) DEVICE FOR CALIBRATING POSITION OF TRUCK AND METHOD THEREOF

(71) Applicant: Hyundai Motor Company, Seoul (KR)

(72) Inventor: Jung Whan Yeum, Chungcheongbuk-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 270 days.

(21) Appl. No.: 14/724,533

(22) Filed: May 28, 2015

(65) Prior Publication Data

US 2016/0145049 A1    May 26, 2016

(30) Foreign Application Priority Data

Nov. 26, 2014   (KR) .......................... 10-2014-0166425

(51) Int. Cl.
| | |
|---|---|
| *G01M 17/00* | (2006.01) |
| *B65G 43/08* | (2006.01) |
| *B65G 54/02* | (2006.01) |
| *G01D 5/34* | (2006.01) |

(52) U.S. Cl.
CPC ............. *B65G 43/08* (2013.01); *B65G 54/02* (2013.01); *G01D 5/34* (2013.01)

(58) Field of Classification Search
USPC ........................................ 73/116.01, 117.01
See application file for complete search history.

(56) References Cited

U.S. PATENT DOCUMENTS

| | | | | |
|---|---|---|---|---|
| 4,589,184 A | * | 5/1986 | Asano | B25J 9/0093 198/575 |
| 4,627,158 A | * | 12/1986 | Mitoh | B23P 19/047 29/771 |
| 4,734,979 A | * | 4/1988 | Sakamoto | B23P 21/004 198/468.4 |
| 4,738,022 A | * | 4/1988 | Sakamoto | B62D 65/02 198/409 |
| 4,924,996 A | * | 5/1990 | Svensson | B05B 15/061 134/123 |
| 6,554,119 B2 | * | 4/2003 | Oldford | B62D 65/18 198/345.3 |
| 6,804,583 B2 | * | 10/2004 | Kim | B25J 9/1697 700/114 |

(Continued)

FOREIGN PATENT DOCUMENTS

| | | |
|---|---|---|
| JP | 01-226482 A | 9/1989 |
| JP | H05-000118 A | 1/1993 |

(Continued)

*Primary Examiner* — Eric S McCall
(74) *Attorney, Agent, or Firm* — McDermott Will & Emery LLP

(57) ABSTRACT

A truck for examination of a vehicle body includes a moving module configured to move truck bases with a vehicle body fixed thereto, a sensor module configured to be moved by the moving module and to measure stop position distribution of the truck base that reaches a predetermined position, and a calibration module configured to adjust a position of the truck base based on the measured distribution. The examination truck may enhance reliability of measurement result of assembly precision in a system for measuring the assembly precision of the vehicle body in a vehicle body assembly line.

12 Claims, 5 Drawing Sheets

(56) References Cited

U.S. PATENT DOCUMENTS

| | | | |
|---|---|---|---|
| 7,967,283 B2* | 6/2011 | Cho | B25B 5/06 269/58 |
| 2008/0000068 A1* | 1/2008 | Savoy | B23P 21/004 29/429 |
| 2009/0095797 A1* | 4/2009 | Hur | B62D 65/18 228/212 |
| 2010/0274514 A1* | 10/2010 | Kamachi | G01B 21/26 702/94 |
| 2011/0265301 A1* | 11/2011 | Kilibarda | B23K 37/047 29/407.01 |
| 2013/0035783 A1* | 2/2013 | Scheuerman | B62D 65/18 700/230 |
| 2014/0119874 A1* | 5/2014 | Choi | B65D 65/18 414/749.1 |
| 2016/0086006 A1* | 3/2016 | Song | G06K 7/10574 235/462.32 |

FOREIGN PATENT DOCUMENTS

| | | |
|---|---|---|
| JP | 06-56058 A | 3/1994 |
| JP | 07-244511 A | 9/1995 |
| JP | 09-309473 A | 12/1997 |
| JP | H10-157672 A | 6/1998 |
| JP | 2013-100180 A | 5/2013 |
| KR | 10-0999642 B1 | 12/2010 |

\* cited by examiner

DEVICE FOR CALIBRATING POSITION OF TRUCK AND METHOD THEREOF

CROSS-REFERENCE TO RELATED APPLICATION

This application is based on and claims the benefit of priority to Korean Patent Application No. 10-2014-0166425, filed on Nov. 26, 2014 in the Korean Intellectual Property Office, the disclosure of which is incorporated herein by reference in its entirety.

TECHNICAL FIELD

The present disclosure relates to a truck for examination of a vehicle body, and more particularly, to a calibration truck and a calibration method thereof, for calibrating a position of a truck with a vehicle body fixed thereto to enhance the reliability of measurement result of assembly precision in a system for measuring the assembly precision of the vehicle body in a vehicle body assembly line.

BACKGROUND

In an automobile assembly line, various components are coupled to a vehicle body B via a method such as welding, etc. as an automated process. In addition, a device for examining whether components are appropriately welded to a desired position as the result of assembly process is also automated.

FIG. 1 is a perspective view of a conventional truck structure. Referring to FIG. 1, the conventional truck structure is configured in such a way that a truck base 16 is placed on a truck rail 10 and moves along the truck base 16 by a moving magnet 12 installed on the truck rail 10.

The truck base 16 moves up to a point in which a stopper 14 is installed, and examination is performed on a vehicle body B positioned on a fixed unit 91 on the truck base 16 stopped by the stopper 14.

However, a measurement robot for the examination repeats measurements at a predetermined position, and thus when dispersion is concentrated on a stop position of the aforementioned truck base, dispersion also accumulates with regard to values measured by the measurement robot, and thus accurate examination result is not achieved.

SUMMARY

The present disclosure has been made to solve the above-mentioned problems occurring in the prior art while advantages achieved by the prior art are maintained intact.

An aspect of the present disclosure provides a truck structure and a calibration method thereof, for calibrating a position of a truck prior to examination to prevent examination result from being affected by a dispersion difference according to a difference in stop positions of the truck.

According to an exemplary embodiment of the present disclosure, a calibration truck includes a moving module configured to move a truck base with a vehicle body fixed thereto, a sensor module configured to be moved by the moving module and to measure stop position dispersion of the truck base that reaches a predetermined position, and a calibration module configured to adjust a position of the truck base based on the measured.

The moving module may include a moving magnet configured to be installed on a truck rail and to move the truck bases according to magnetism, and a stopper configured to determine a stop position of the truck.

The stopper may move between a position in which the stopper protrudes on a truck rail and a position in which the stopper goes into the truck rail.

The sensor module may include a light receiver formed on the truck base, and a sensor assembly configured to measure a position of the light receiver.

The sensor assembly may include a base at a fixed position, and a measuring sensor configured to move between a first position from the base toward the truck base and a second position spaced apart from the truck base and to measure the position of the light receiver at the first position.

The measuring sensor may be installed on a bracket installed in a motor cylinder fixed to the base and moved backward and forward according to an operation of the motor cylinder.

The calibration module may calibrate a position of a second truck base positioned on a first truck base with respect to the first truck base positioned on a truck rail.

The calibration truck may further include a pinion extending in parallel to a moving direction of any one of the first truck base and the second truck base, and a rack engaged with the pinion at the remaining one of the first truck base and the second truck base, wherein the position of the second truck base with respect to the first truck base may be calibrated via rotation of the rack.

The second truck base may be moved backward and forward in the same direction as a moving direction of the truck base by a linear guide installed on the first truck base.

According to another exemplary embodiment of the present disclosure, a method of calibrating a truck base using the calibration truck includes moving a truck base to a position in which the truck base is stopped by a stopper, measuring stop position dispersion of the stopped truck base, and calibrating and adjusting a position of the truck base using the measured dispersion.

The measuring may include moving a measuring sensor to a first position close to the truck base from a second position close to the base, detecting a position of a light receiver of the truck base at the first position, and moving the measuring sensor to the second position when the detecting is completed.

The method may further include calculating displacement between the measured position dispersion and a home position and determining whether calibration is performed by a calibration module, a calibration direction and a calibration amount.

The method may further include converting a direction of the calibration into a rotation direction of a motor for rotation of a rack, and converting the calibration amount into a rotation angle of the motor.

The method may further include examining assembly precision of a vehicle body mounted on a second truck base after calibration of the second truck base is completed in a direction determined in the converting and by as much as a predetermined distance.

The stopper may go below a surface of a truck rail and the truck base may move when the examining of the assembly precision is completed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments will now be described more fully with reference to the accompanying drawings.

Figure 1:
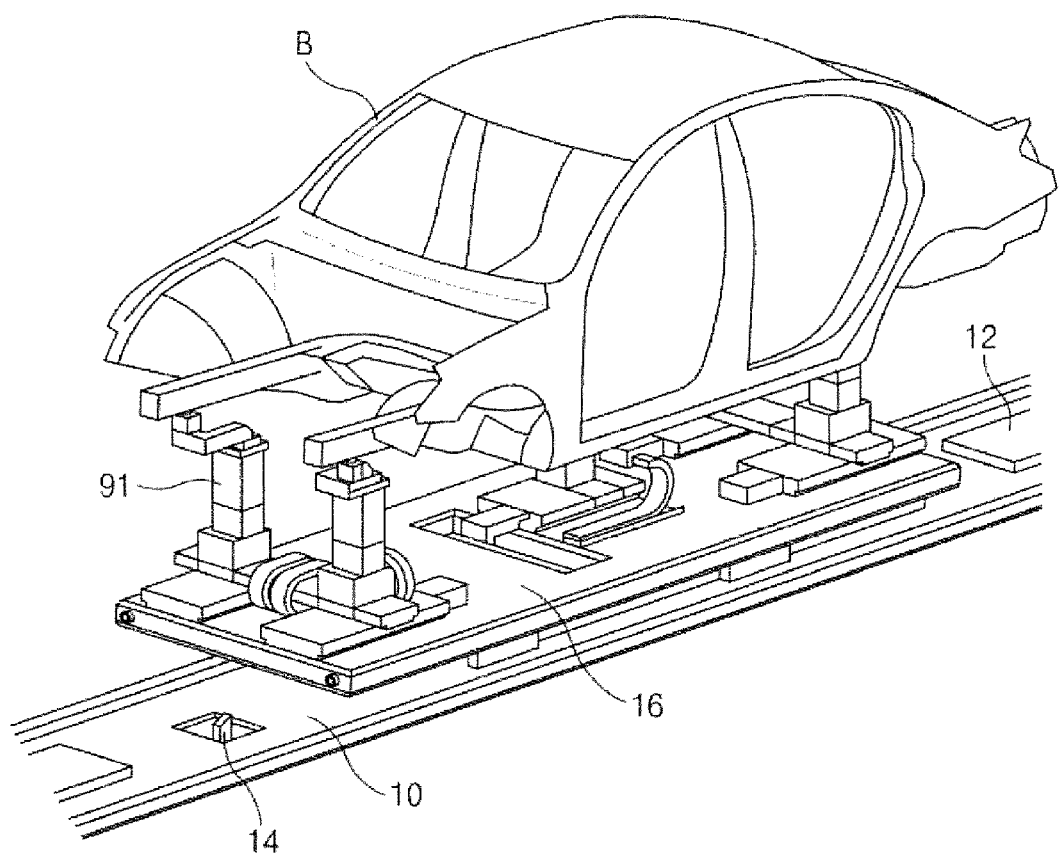
FIG. 1 is a perspective view of a conventional truck structure.
Figure 2:
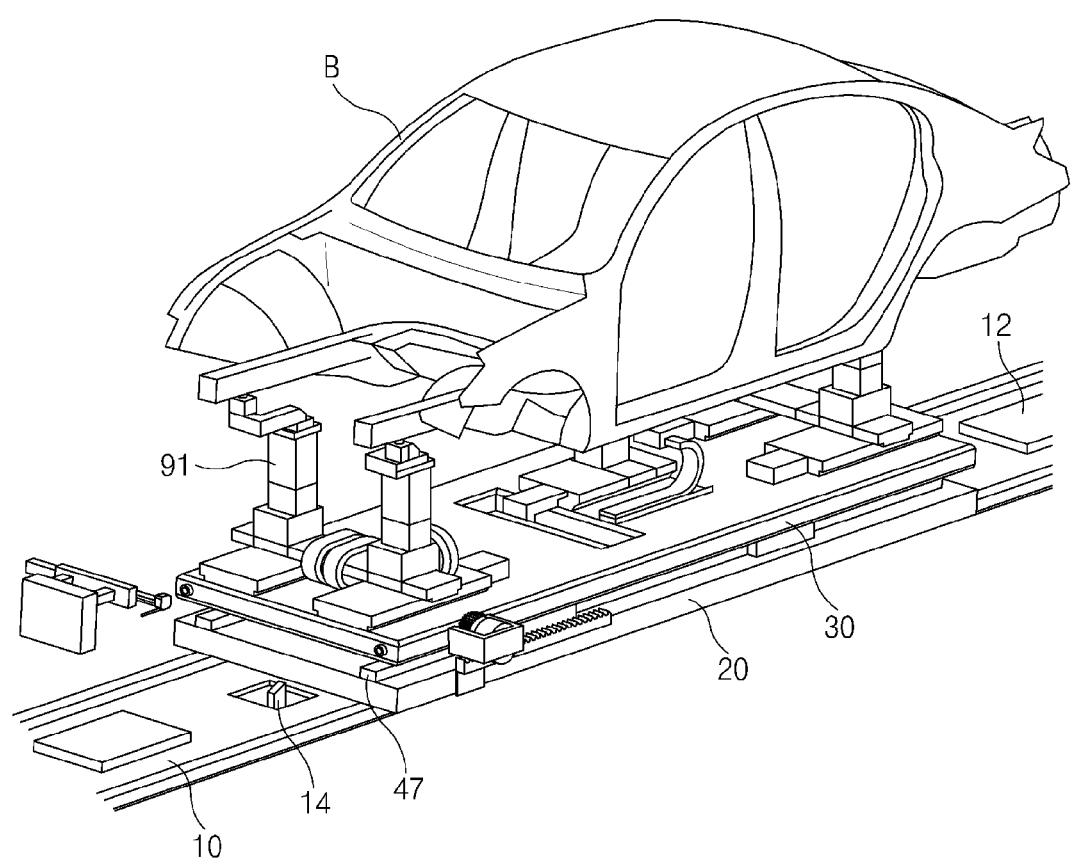
FIG. 2 is a perspective view illustrating a state in which a vehicle body is placed on a truck structure according to an embodiment of the present disclosure.
Figure 3:
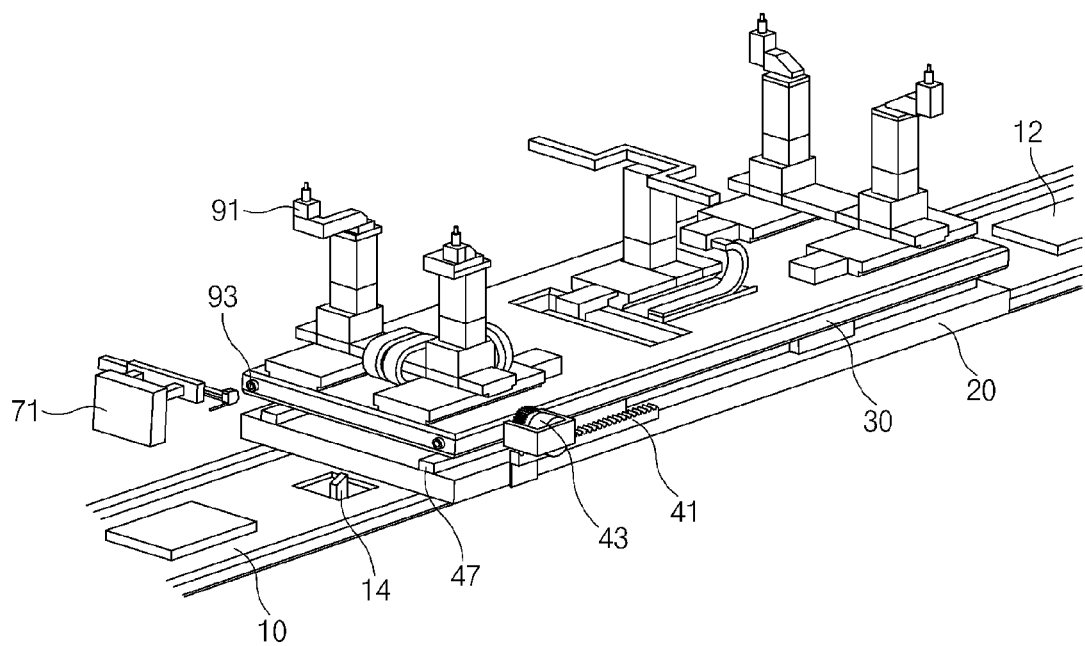
FIG. 3 is a perspective view illustrating a state in which a vehicle body is not placed on a truck structure according to an embodiment of the present disclosure.
Figure 4:
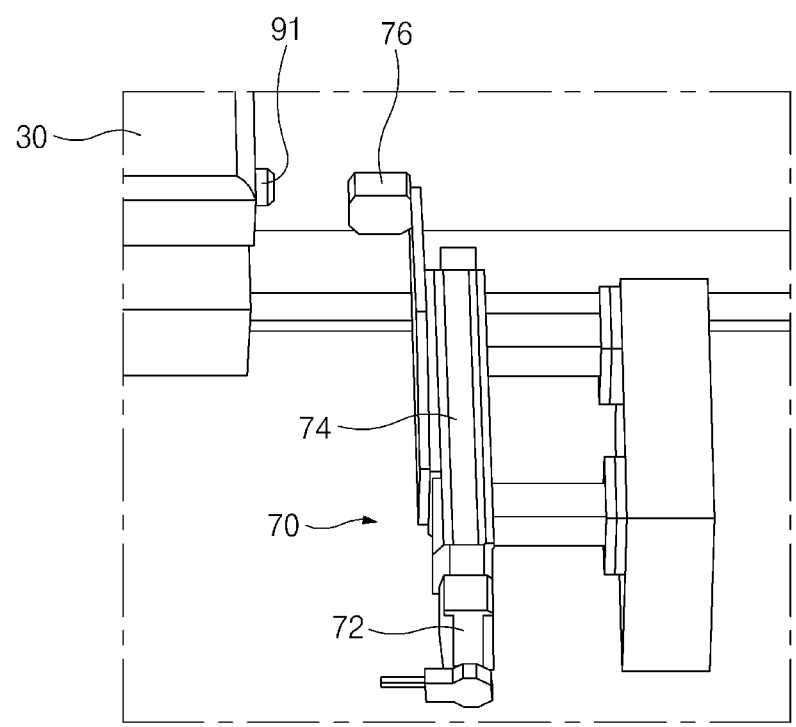
FIG. 4 is an enlarged perspective view of a sensor module of a truck according to an embodiment of the present disclosure.
Figure 5:
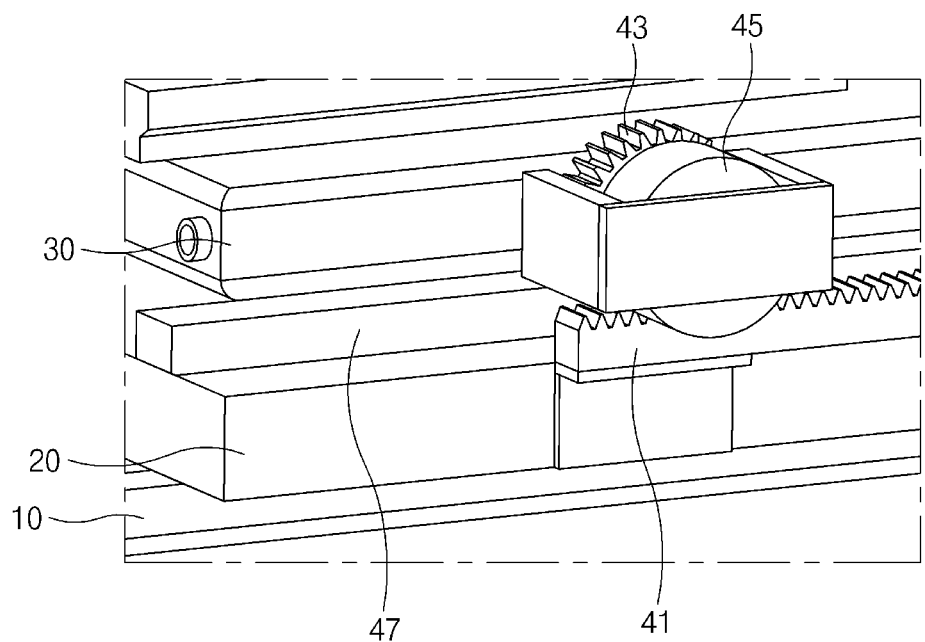
FIG. 5 is an enlarged perspective view of a calibration module of a truck according to an embodiment of the present disclosure.

FIG. 2 is a perspective view illustrating a state in which a vehicle body is placed on a truck structure according to an embodiment of the present disclosure. FIG. 3 is a perspective view illustrating a state in which a vehicle body is not placed on a truck structure according to an embodiment of the present disclosure. FIG. 4 is an enlarged perspective view of a sensor module of a truck according to an embodiment of the present disclosure. FIG. 5 is an enlarged perspective view of a calibration module of a truck according to an embodiment of the present disclosure.

The calibration truck according to the present disclosure may be largely classified into three modules.

1. A moving module for moving truck first and second bases 20 and 30 to which a vehicle body B is fixed.

2. A sensor module for measuring stop position dispersion of the second truck base 30 that is moved by the moving module and reaches a predetermined position.

3. A calibration module for adjusting a position of the second truck base 30 based on the measured dispersion.

[Moving Module]

Referring to FIG. 2, the truck rail 10 corresponds to a moving path of the truck bases 20 and 30 on which the vehicle body B is mounted, and a series of equipments (not shown) for measuring the assembly precision of the vehicle body B are installed in parallel to each other on the moving path.

Moving magnets 12 are installed to be spaced apart from each other by a predetermined interval on the moving module. In this regard, the truck bases 20 and 30 are moved forward along the truck rail 10 according to change in magnetism of the moving magnets 12.

A position where the truck bases 20 and 30 need to be stopped for examination of the vehicle body B is determined by a stopper 14 installed at the truck rail 10, as illustrated in the drawings.

As illustrated in the drawings, the stopper 14 is operated with two positions of one position in which the stopper 14 protrudes above the truck rail 10 and another position in which the stopper 14 goes into the truck rail 10 when the stopper 14 retreats from the one position. When the stopper 14 protrudes, the truck base comes in contact with the stopper 14 and stops, and when the stopper 14 goes into the truck rail 10, the truck base may be changed in a state in which the truck base is capable of being moved.

[Sensor Module]

The sensor module according to the present disclosure includes a light receiver 93 formed on the second truck base 30 and a sensor assembly 70 for measurement of a position of the light receiver 93 based on a fixed position separately from the truck base.

When the sensor assembly 70 performs measurement based on a position outside the truck base and the truck rail, dependently from the truck base and the truck rail, accurate measurement result is achieved. For example, the sensor assembly 70 may be installed on a base such as a robot at a stop position of the corresponding truck base.

The sensor assembly 70 includes a base 71 at a fixed position. In addition, the sensor assembly 70 further includes a measuring sensor 76 that moves between a first position from the base 71 toward the second truck base 30 and a second position spaced apart from the second truck base 30. The measuring sensor 76 measures a position of the light receiver 93 at the first position toward the second truck base 30.

For example, the measuring sensor 76 measures a distance to the light receiver 93 on the second truck base 30 from the measuring sensor 76 and compares the measured distance with a reference distance to determine whether the second truck base 30 is positioned at a home position and how far and which direction the second truck base 30 is spaced apart from the home position when the second truck base 30 is not positioned at the home position.

Needless to say, this measurement is performed on the assumption that displacement of the light receiver 93 on a plurality of second truck bases 30 moving on the truck rail 10 and displacement of the fixed unit 91 for mounting the vehicle body B are identical to each other.

As illustrated in the drawings, the light receiver 93 is installed on a front surface of the second truck base 30, and thus the measuring sensor 76 needs to measure the position of the light receiver 93 in front of the second truck base 30. However, a measurement position of the measuring sensor 76 is put on a moving path of the truck bases 20 and 30, and thus interference occurs.

Thus, the measuring sensor 76 needs to be deviated from the moving path of the truck bases 20 and 30 except when the measuring sensor 76 performs measurement.

Accordingly, according to the present disclosure, the measuring sensor 76 may be installed in a motor cylinder 72 fixed to the base 71 so as to be moved backward and forward according to an operation of the motor cylinder 72. For example, the measuring sensor 76 is installed on a bracket 74 that moves backward and forward by the motor cylinder 72 so as to be moved backward and forward.

[Calibration Module]

The calibration module of the calibration truck according to the present disclosure calibrates a position of the second truck base 30 positioned on the first truck base 20 with respect to the first truck base 20 positioned on the truck rail 10.

To this end, according to the present disclosure, first, a pinion 41 extending in parallel to a moving direction of the truck base is installed at a lateral surface of the first truck base 20. As illustrated in FIG. 3, opposite ends of the pinion 41 are fixed to the lateral surface of the first truck base 20 through a bracket.

Then a rack 43 engaged with the pinion 41 is installed at a lateral surface of the second truck base 30. The rack 43 may be installed directly on an axis of a motor 45, and opposite ends of the axis of the motor 45 may be supported by the bracket installed at the lateral surface of the second truck base 30 and the second truck base 30, as illustrated in FIG. 5.

Needless to say, the support structure of the motor axis is not limited to this structure. Alternatively, the pinion 41 and the rack 43 may be installed at opposite sides, respectively.

In conclusion, by virtue of this structure, the position of the second truck base 30 with respect to the first truck base 20 may be calibrated via rotation of the rack 43.

As illustrated in FIG. 3, two linear guides 47 are installed in parallel to each other on the first truck base 20 at opposite lateral surfaces in a longitudinal direction, and the second truck base 30 are placed on the linear guides 47.

The second truck base 30 is capable of being moved backward and forward along the linear guides 47 installed on the first truck base 20.

[Method of Calibrating Position of Truck Base]

The above configured calibration truck according to the present disclosure performs calibration using the following method.

First, the truck bases 20 and 30 are moved to a position in which the truck bases 20 and 30 come in contact with the stopper 14 protruding on the truck rail 10 and stop.

Then when the measuring sensor 76 is moved to a first position close to the second truck base 30 from a second position close to the base 71, the measuring sensor 76 detects the position of the light receiver 93 of the second truck base 30 while being positioned at the first position, and then the measuring sensor 76 measures stop position dispersion of the truck bases 20 and 30 by moving the measuring sensor 76 back to the second position as an original position after the detection of the position of the light receiver 93 is completed.

The measured data is compared with a home position as a reference to calculate dispersion. The calculated data corresponds to displacement of a measured position with respect to the home position. Whether calibration is performed by the calibration module, a calibration direction and a calibration amount are determined and calculated based on the calculated data.

A calculated and determined calibration direction are converted into a rotation direction of the motor 45 for rotation of the rack 43 and the calibration amount is converted into a rotation angle of the motor 45. When the motor 45 is rotated based on an operation command, the position of the second truck base 30 is calibrated.

When the calibration is completed, the assembly precision of the vehicle body B mounted on the second truck base 30 is examined. When the examination is completed, the stopper 14 goes below a surface of the truck rail 10 and the truck bases 20 and 30 are moved to a next stop position.

According to the present disclosure, a truck may be calibrated to a home position before a vehicle body is examined so as to prevent stop position dispersion of the truck from being reflected to a measured value of an examination robot, thereby achieving reliable examination result.

In addition, the detailed advantages of the present disclosure have been described above.

While the present disclosure has been particularly shown and described with reference to exemplary embodiments and drawings thereof, it will be understood by those of ordinary skill in the art that various changes in form and details may be made therein without departing from the spirit of the present disclosure as defined by the following claims.

What is claimed is:

1. A calibration truck comprising:
a moving module configured to move a truck base with a vehicle body fixed thereto;
a sensor module configured to be moved by the moving module and to measure stop position dispersion of the truck base that reaches a predetermined position; and
a calibration module configured to adjust a position of the truck base based on the measured stop position dispersion; and
wherein the sensor module includes:
a light receiver formed on the truck base; and
a sensor assembly configured to measure a position of the light receiver, and
wherein the sensor assembly includes:
a base at a fixed position; and
a measuring sensor configured to move between a first position from the base toward the truck base and a second position spaced apart from the truck base and to measure the position of the light receiver at the first position.

2. The calibration truck according to claim 1, wherein the moving module includes:
a moving magnet configured to be installed on a truck rail and to move the truck base according to magnetism; and
a stopper configured to determine a stop position of the truck base.

3. The calibration truck according to claim 2, wherein the stopper moves between a position in which the stopper protrudes from the truck rail and a position in which the stopper goes into the truck rail.

4. The calibration truck according to claim 1, wherein the measuring sensor is installed on a bracket installed in a motor cylinder fixed to the base and moved backward and forward according to an operation of the motor cylinder.

5. The calibration truck according to claim 1, wherein the truck base includes a first truck base and a second truck base; and
the calibration module calibrates a position of the second truck base positioned on the first truck base with respect to the first truck base positioned on a truck rail.

6. The calibration truck according to claim 5, further comprising:
a pinion extending in parallel to a moving direction of any one of the first truck base and the second truck base; and
a rack engaged with the pinion at the remaining one of the first truck base and the second truck base,
wherein the position of the second truck base with respect to the first truck base is calibrated via rotation of the rack.

7. The calibration truck according to claim 5, wherein the second truck base is moved backward and forward in the same direction as a moving direction of the truck base by a linear guide installed on the first truck base.

8. A method of calibrating a truck base using the calibration truck according to claim 1, the method comprising steps of:
moving a truck base to a position in which the truck base is stopped by a stopper, by the moving module;
measuring stop position dispersion of the stopped truck base, by the sensor module; and
calibrating and adjusting a position of the truck base using the measured stop position dispersion, by the calibration module; and
calculating displacement between the measured stop position dispersion and a home position and determining whether calibration is performed by a calibration module, a calibration direction and a calibration amount.

9. The method according to claim 8, wherein the step of measuring includes:
   moving a measuring sensor to a first position close to the truck base from a second position close to the base;
   detecting a position of a light receiver of the truck base at the first position; and
   moving the measuring sensor to the second position when the detecting is completed.

10. The method according to claim 8, further comprising converting the calibration direction into a rotation direction of a motor for rotation of a rack and converting the calibration amount into a rotation angle of the motor.

11. The method according to claim 10, further comprising examining assembly precision of a vehicle body mounted on a second truck base after calibration of the second truck base is completed in a direction determined in the converting and by as much as a predetermined distance.

12. The method according to claim 11, wherein the stopper goes below a surface of a truck rail and the truck base moves when the examining of the assembly precision is completed.

* * * * *